UNITED STATES PATENT OFFICE.

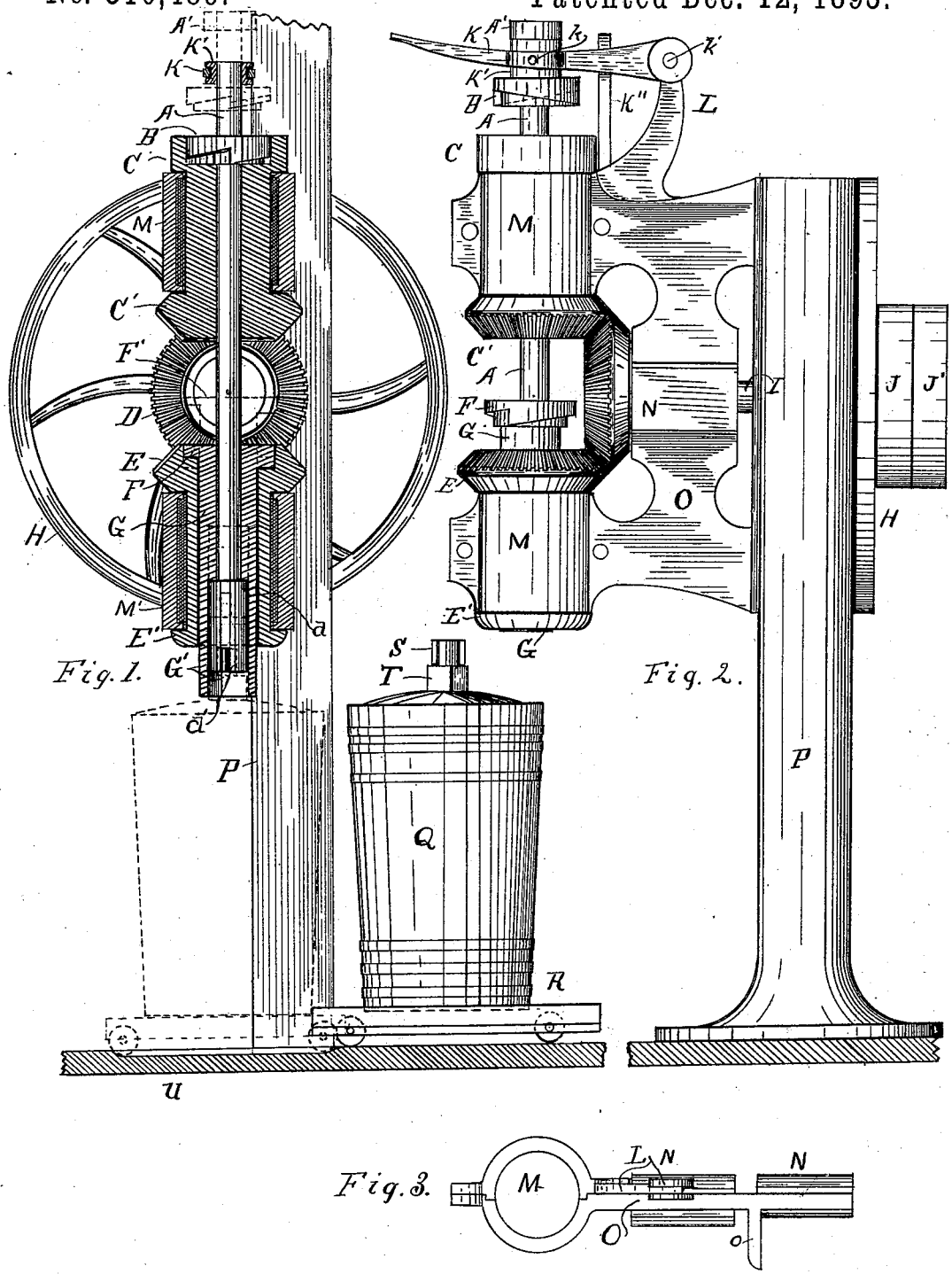

AUGUSTUS J. RUDELL, OF GRAND RAPIDS, MICHIGAN.

ICE-CREAM FREEZER.

SPECIFICATION forming part of Letters Patent No. 510,489, dated December 12, 1893.

Application filed March 7, 1893. Serial No. 464,983. (No model.)

*To all whom it may concern:*

Be it known that I, AUGUSTUS J. RUDELL, a citizen of the United States, residing at Grand Rapids, in the county of Kent and State of Michigan, have invented certain new and useful Improvements in Ice-Cream Freezers, of which the following is a specification.

My invention relates to improvements in the power transmitting mechanism of ice cream freezers and adjusting the freezing tub thereto, and its objects are, first, to provide a power transmitting mechanism for ice cream freezers that may be attached to, or detached from its supporting post at pleasure; second, to provide a power transmitting mechanism for ice cream freezers that may be attached to or detached from the tub and the tub set in position, or removed without stopping the power; third, to provide a power transmitting mechanism for ice cream freezers with which a single motion will disengage the power from the tub and the dasher; fourth, to provide an ice cream freezer with which the tub support is entirely detached from and independent of the power transmitting mechanism or its supports; and fifth, to provide an ice-cream freezer with which the tub support will when placed beneath the power transmitting mechanism invariably stop with the center of the can cover and the dasher shaft directly under the clutches on the power transmitting shafts. I attain these results by the mechanism illustrated in the accompanying drawings, in which—

Figure 1 is a transverse vertical section of my power transmitting mechanism with the outlines of a tub in position. Fig. 2 is a side elevation of the same mounted upon an iron supporting post or column; and Fig. 3 is a top plan of the same detached from the support.

Similar letters refer to similar parts throughout the several views.

My device consists of a revolving shaft A, arranged to revolve freely in the bearings through the bevel gear wheels and their hubs C C' and E E' and provided at its upper end with a clutching device B, arranged to engage with a corresponding clutching device at the top of the bearing C' or disengaged therefrom by raising or lowering it with the lever K, which is pivotally connected therewith by means of the sleeve K' in which the shaft turns freely. This lever is pivoted to the standard L, as at k', and may be held in place to support the shaft when raised, by the latch K". The lower end of this shaft is provided with a head a, which fits in, and bears upon the upper end of, the chamber G' in the lower end of the spindle G so that said shaft must rise and fall with the shaft A, and when the shaft A is raised to the position shown in Fig. 2, and indicated by the dotted lines in Fig. 1, the spindle G will be carried up entirely clear of the top of the dasher shaft S, as shown in Fig. 2, so that its tub may be easily and conveniently removed from under. This spindle G, is provided at its upper end with a clutch F arranged to engage with a corresponding clutch in the upper end of the bearing E E' so that when it is lowered to the position indicated in Fig. 1, said clutches will engage with, and cause the spindle G to revolve with its bearing as hereinafter more fully described. The lower end of this shaft is provided with a suitable coupling or locking device, usually a square socket G', to engage with the top of the cam at T and revolve the cam in one direction while the shaft A is provided with a suitable locking device, as a' to engage with and revolve the shaft S of the dasher in the opposite direction.

The revolving bearing or spindle C is provided at is lower end with a bevel gear wheel C' and is supported to revolve freely in the bearing M, and the lower revolving bearing or shaft is provided with a corresponding bevel-gear at its upper end, and is supported to revolve freely in the bearing M' while a corresponding bevel gear D is supported upon the shaft I in boxes N, N, in position to mesh freely with both of the bevel gears C' and E' so that it will cause these gears and their shafts or supports to revolve in opposite directions, and when the shafts A and spindle G are in their normal positions, as in Fig. 1, and the clutches B and F interlocked in their respective bearings these shafts will be given corresponding rotary motions, and when interlocked with the cover T and the dasher shaft S, will transmit corresponding reverse rotary motions thereto in the usual manner.

It will be noticed that the shaft A is made to revolve freely in both the bearings C C' and the spindle G, and that the spindle G is, in turn, arranged to revolve freely in the shaft or bearing E E' when the clutches are disengaged as in Fig. 2.

The frame O is so constructed that it may be attached to any convenient post, wood or metal, as desired, and is provided with the necessary boxes or bearings for the support of the several shafts and gear-wheels, and I prefer that the gear-wheels &c., be situated at one side of the supporting post or column P, and the fly-wheel H and pulleys J J' be at the opposite side as shown in Fig. 2. To support the frame securely upon the column, I sometimes form a wing o, at one side.

My tub Q is mounted upon a support that is wholly disconnected from the balance of the device,—preferably a truck R—and to insure its stopping and standing directly under the shaft A and spindle G, I form a slight depression U in the track upon which it is supported.

From the foregoing description it is evident that to disengage and remove the tub and can from my machine it is simply necessary to raise the lever K until it engages with, and is held to position by the latch K'' (situated at any convenient point along the lever), when the lower ends of the shafts A and spindle G will be far enough above the tops of the bearings S and T on the tub, so that the tub can be readily removed, and as the clutches B and F are then disengaged, the shafts A and spindle G are not affected by the running of the gear wheels, and their shafts or bodies, so that my machine may be readily connected to, or disconnected from the tub without stopping the shaft I and the gear wheels, all as hereinbefore set forth.

Having thus described my invention, what I claim as new, and desire to secure by Letters Patent of the United States, is—

1. The combination in an ice cream freezer of a detachable supporting frame, an upper and a lower revolving bearing each provided with a bevel gear at the adjacent ends to mesh with a bevel gear on the driving shaft standing at right angles therewith, a clutch at the upper end of each of said revolving bearings, a short spindle fitting into the lower of said revolving bearings provided at its upper end with a clutching device to engage therewith and at its lower end with a socket to fit upon the cover of the can, a shaft passing through the upper of said revolving bearings and through the short spindle in the lower revolving bearing, a clutch at its upper end, a shoulder at its lower end to engage with the lower shaft and a socket to receive the end of the dasher shaft, and a lever, an adjustable collar and a latch, for manipulating the same, substantially as, and for the purpose set forth.

2. The combination in an ice cream freezer of a supporting frame and driving gear, with two vertical revolving bearings having bevel gear, shafts fitted with clutches to engage with said bearings, a lever and an adjustable collar for engaging and disengaging said clutches, and a detached tub support, substantially as shown.

3. The combination, in an ice cream freezer, of a detachable supporting frame, a driving shaft and gear, two vertical revolving bearings in said frame having bevel gear to mesh with the driving gear, a long shaft having a clutch to engage with the hub of the upper revolving bearing, its lower end having a shoulder to engage with the spindle, and a clutch to engage with the dasher shaft, a cylindrical spindle concentric with said shaft and provided at its upper end with a clutch to engage with the lower revolving bearing and at the lower end with a clutch to engage with the top of the tub, and a shoulder to engage with the shoulder on the shaft, a detached tub support, and depressions in the conducting track to receive the wheels of said support, substantially as, and for the purpose set forth.

Signed at Grand Rapids, Michigan, this 28th day of February, 1893.

AUGUSTUS J. RUDELL.

In presence of—
ITHIEL J. CILLEY,
WALTER C. HEDDEN.